United States Patent [19]
Graham

[11] 3,882,514
[45] May 6, 1975

[54] CAMERA WITH A SELF-CONTAINED LIGHT SYSTEM

[75] Inventor: Thomas G. Graham, Point Pleasant Beach, N.J.

[73] Assignee: Berkey Photo, Inc., Paramus, N.J.

[22] Filed: Feb. 4, 1974

[21] Appl. No.: 439,306

[52] U.S. Cl. ............... 354/149; 240/1.3; 354/195
[51] Int. Cl. ............................................ G03b 15/03
[58] Field of Search ........... 354/126, 139, 149, 270, 354/195, 288; 240/1.3

[56] References Cited
UNITED STATES PATENTS

| | | | |
|---|---|---|---|
| 3,260,181 | 7/1966 | Hennig et al. | 354/149 |
| 3,286,611 | 11/1966 | Lange | 354/126 X |
| 3,783,261 | 1/1974 | Hartmann | 354/149 X |

Primary Examiner—Fred L. Braun

[57] ABSTRACT

A camera with a self-contained light system is provided wherein the direction of the light beam emitted from the light source of the system is automatically varied relative to the optical axis of lens upon manual adjustment of the lens focusing means.

6 Claims, 5 Drawing Figures

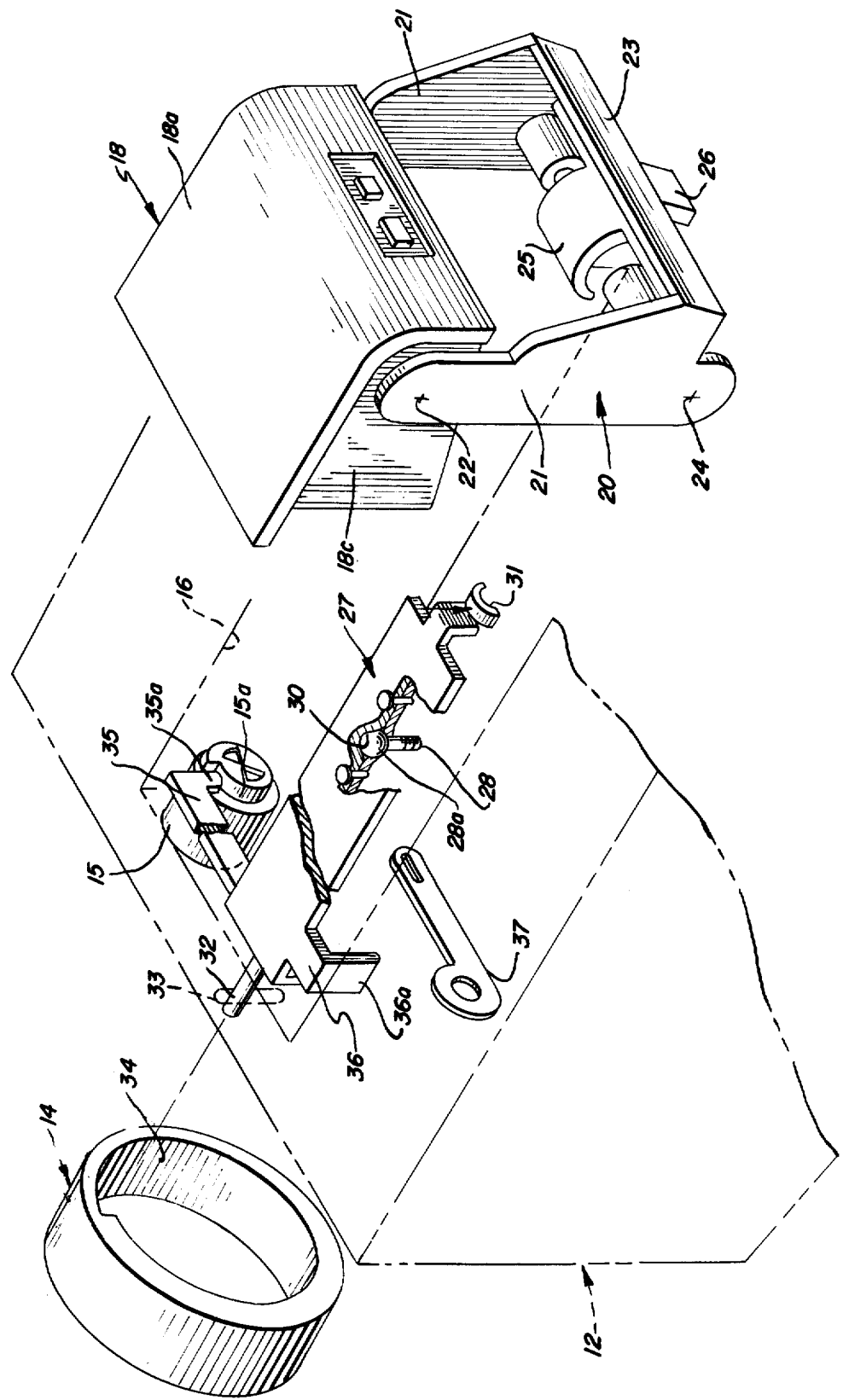

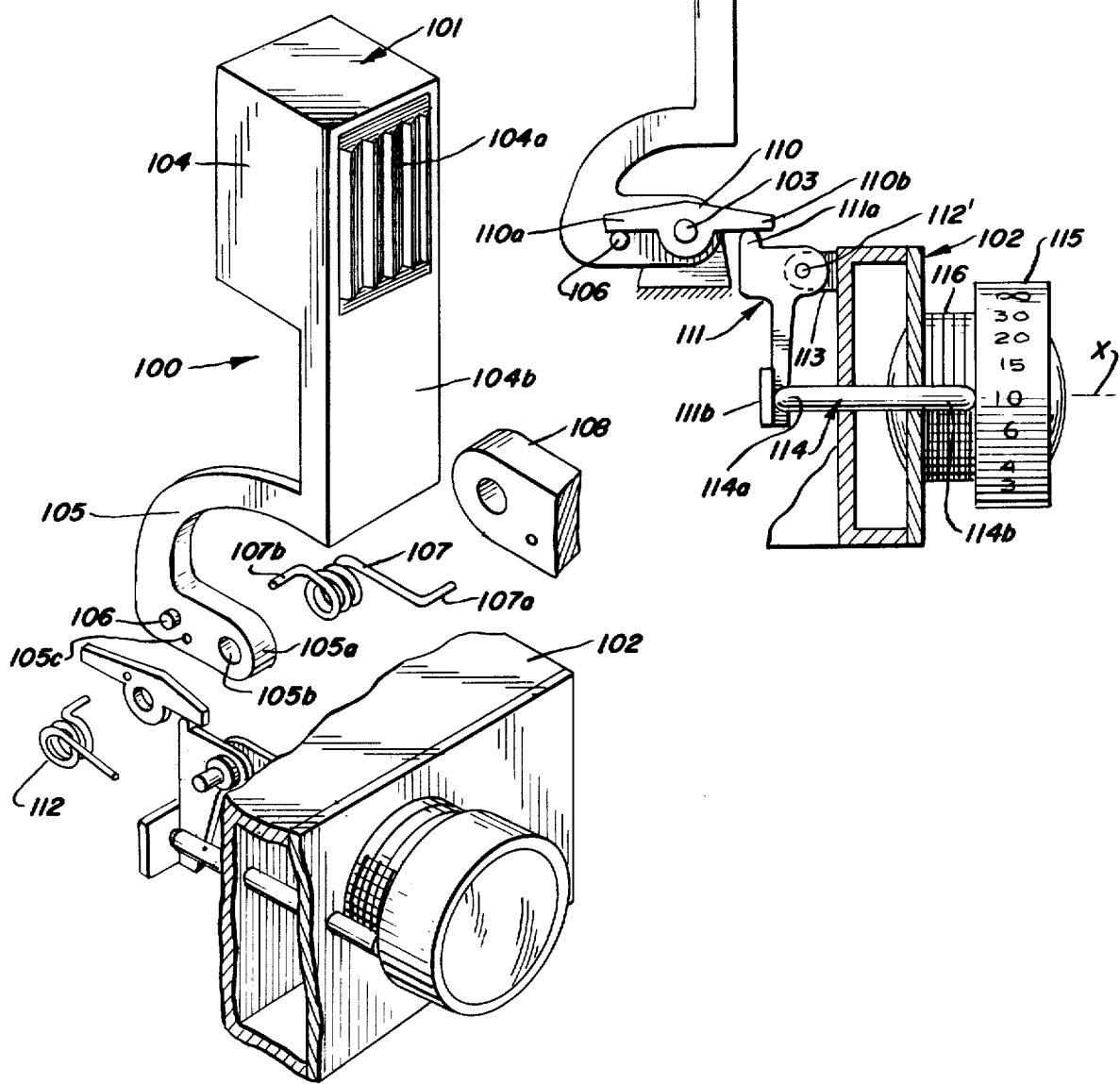

CAMERA WITH A SELF-CONTAINED LIGHT SYSTEM

BACKGROUND OF THE INVENTION

The field of the instant invention relates to a small portable camera having a self-contained light system and more particularly to the light system wherein the direction of the light beam emitted from the light source thereof will be varied relative to the optical axis of the camera upon manual adjustment of the lens focusing device. The extent of the directional variation will depend upon the distance the subject is from the camera and, thus, the subject will be more effectively illuminated by the light beam resulting in improvement in the quality of the photography obtainable with the camera.

Heretofore, various cameras with self-contained light systems have been available; however, in each instance, the axis of the emitted light beam remained in a fixed relation with respect to the optical axis of the camera lens. Because of this fixed relationship, proper illumination of the subject was extremely difficult, if not impossible, to achieve when the subject was less than a predetermined distance from the camera. To compensate for this parallactic condition, it was frequently necessary to utilize supplemental lighting. In certain prior cameras, attempts were made to overcome this problem by positioning the light source as close to the optical axis as possible; however, such an arrangement resulted in a costly, complex construction and oftentimes rendered the camera awkward to manipulate. With other prior cameras of this type, it was suggested in order to correct the problem that the photographer remove the light system from the camera housing and hold same in proper position independently of the camera before photographing the subject. In still other prior cameras, the parallax problem associated with the lighting was compensated by utilizing a plurality of parallel, adjustable shutter-like deflector members positioned forwardly of the light source which would deflect the emitted light beam towards the subject. This latter device, however, was of costly fragile construction and oftentimes required an inordinate amount of servicing in order to maintain in operative condition.

SUMMARY OF THE INVENTION

Thus, it is an object of this invention to provide a camera having a self-contained light system which is of simple, sturdy and inexpensive construction, and effectively avoids any parallax problems by reason of the light source being positioned offset relative to the optical axis of the lens.

It is a further object of the invention to provide a camera having a self-contained light system wherein the latter, when not required, can assume a recessed inoperative position within the camera housing and, thus, not interfere with the manual manipulation or carrying of the camera.

It is a still further object of the invention to provide a camera having an adjustable self-contained light system wherein adjustment thereof is automatically effected through manual adjustment of the lens focusing means embodied within the camera.

It is a still further object of the invention to provide a camera of the type described which includes a light control means for the lens which is adjustable independently of the focusing means and yet utilizes a common element which is adapted to transmit adjustment of either the focusing means or the light control means or both to effect variation of the light beam direction and/or effect control of the amount of light passing through the lens to expose the film accommodated within the camera.

Further and additional objects will appear from the description, accompanying drawings and appended claims.

In accordance with one embodiment of the invention a camera having an adjustable self-contained light system is provided wherein the direction of the light beam from the light source is automatically varied relative to the optical axis of the lens so as to properly illuminate the subject being photographed. Adjustment of the light beam direction is effected only through manual adjustment of the focusing means associated with the camera lens. The camera includes a housing having mounted on one side thereof a lens, focusing means, and a shutter mechanism. A light system is also provided which is adjustably mounted on a second side of the housing. The housing second side includes a recess in which the light system is disposed when said system assumes an inoperative position. The light system is provided with a reflector unit in which is disposed an electrically energized light source. The front side of the unit permits a light beam from the source to pass therethrough when the system is disposed in an operative position. The reflector unit is connected to the housing by an elongated bracket having one end portion thereof pivotally connected to segments of the housing recess, and the opposite end portion pivotally connected to the reflector unit. Biasing means are provided for urging the bracket to assume an extended position with respect to the housing recess and for urging the reflector unit to assume a first predetermined position of pivotal adjustment relative to the bracket only when the latter is in said extended position. The lens focusing means is provided with cam means. Light control means, separate from the focusing means, is adjustably mounted on said camera housing and is provided with cam means. An elongated adjustable follower means is provided which is mounted on the housing and has one end thereof engageable with the cam means of said focusing means when the bracket and reflector unit are in operative position. A second end of the follower means engages the bracket. Disposed intermediate the ends of the follower means is a laterally extending first projection which engages the cam means of the light control means.

Adjustment of the focusing means is transmitted to the bracket through movement of the follower means about a first axis which effects controlled tilting of the bracket once the latter is in its extended position whereby the direction of the light beam emitted from the reflector unit may be varied relative to the optical axis of the lens.

Adjustment of the light control means is independent of the focusing means and is transmitted by a second projection on the follower means to an adjustable iris member mounted on the housing through movement of the follower means about a second axis. The iris member varies the amount of light passing through the lens to effect exposure of the film accommodated within the housing. When the light system assumes an inoperative position within the housing recess, the follower means is no longer responsive to the adjustment of the focusing means. A manually actuated latch retains the reflector unit and the bracket in an inoperative position within the housing recess.

DESCRIPTION

For a more complete understanding of the invention, reference should be made to the drawings wherein:

FIG. 3 is a fragmentary, perspective exploded view of the light system shown in FIGS. 1 and 2.

FIG. 4 is similar to FIG. 3 but showing a second form of an improved light system.

FIG. 5 is a fragmentary, vertical, sectional view of the light system of FIG. 4 and showing same in an operative position.

Figure 1:
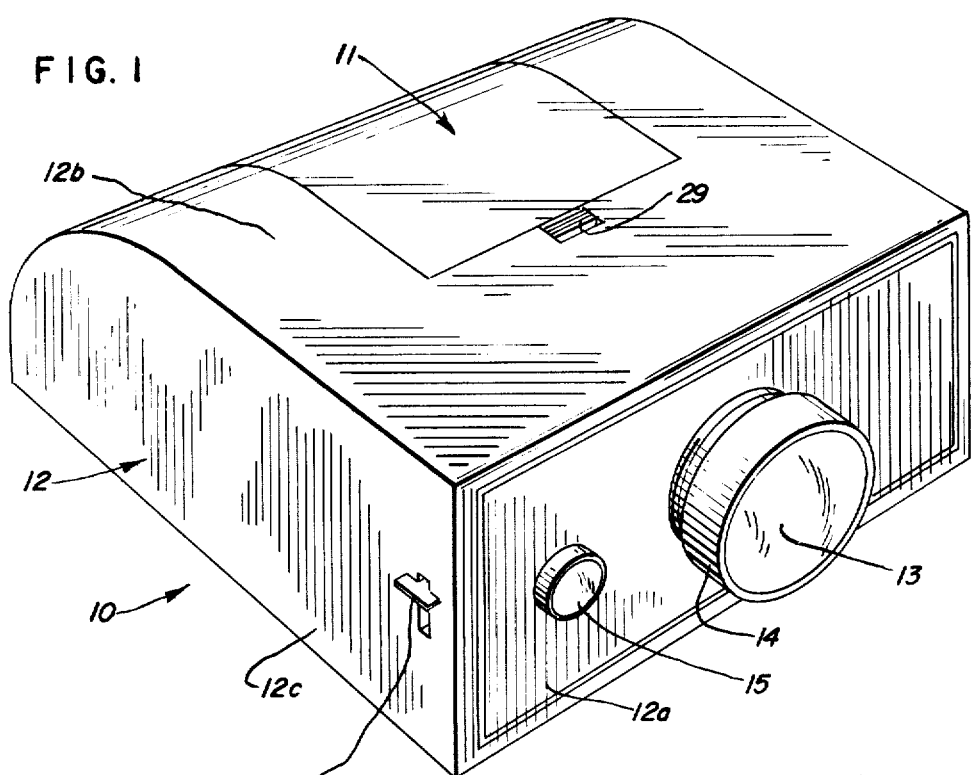
FIG. 1 is a perspective view of one form of the improved camera showing the self-contained light system therefor disposed in an inoperative position.
Figure 2:
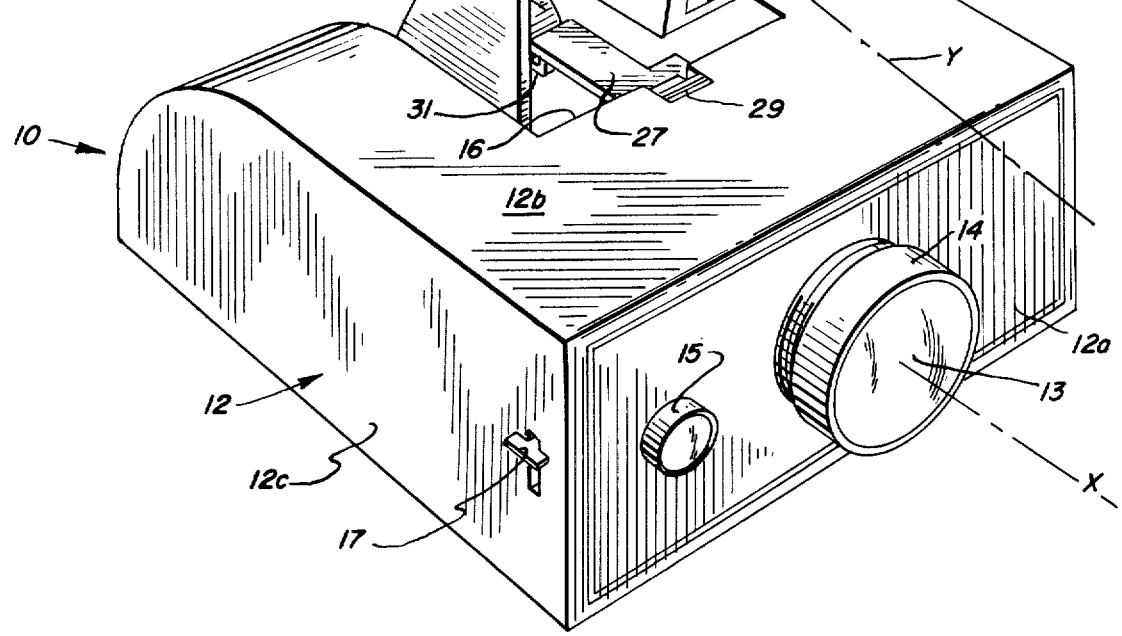
FIG. 2 is similar to FIG. 1 but showing the self-contained light system disposed in an operative position.

Referring now to the drawings and more particularly to FIGS. 1 and 2, an improved camera 10 is shown which is provided with an adjustable self-contained light system 11. Basically the illustrated camera 10 includes a housing 12 of opaque material. Mounted on the front side 12a of the housing are a lens 13, a manually adjustable focusing ring 14 encompassing the lens, and a light control knob 15 laterally offset with respect to the lens 13.

The upper side 12b of the housing is provided with a recess 16 in which various components of the light system are disposed when the latter assumes an inoperative position, see FIG. 1.

The lens 13 has a fixed optical axis X which is disposed substantially perpendicular to the housing front side 12a. The roll or cartridge of film, not shown, which is to be exposed, is accommodated within the housing in any suitable manner well known in the art.

A manually adjustable trigger lever 17 is shown mounted on the side wall 12c of the housing and is adapted to actuate the shutter mechanism, not shown, to effect exposure of a portion of the accommodated film. The location and configuration of the trigger lever or shutter release means may vary from that shown without departing from the scope of the invention.

The form of the light system 11, shown in FIGS. 1–3, includes a reflector unit 18 having a contoured upper exposed surface 18a which conforms to the exterior surface configuration of the housing. The front side 18b of unit 18 is formed of a transparent or translucent material and permits a light beam Y to pass therethrough from the electrically energized light source, not shown, disposed within the unit. The energizing of the light source occurs only when the reflector unit is disposed in its operative position, as seen in FIG. 2, and is synchronized with the actuation of the shutter release lever 17.

The unit 18 is connected to the housing 12 by a mounting means such as a bracket 20, which, as seen in FIG. 3, is substantially U-shaped and has a pair of arms 21 thereof pivotally connected at 22 to opposite sides 18c of the unit. An elongated base portion 23 of the bracket 20 interconnects the opposite ends of the arms 21 and is pivotally connected to the bottom of the recess 16 so that the pivotal axis 24 is substantially parallel to axis 22 of the unit 18. It will be noted in FIG. 3 that base portion 23 is provided with a substantially centrally disposed forwardly curved first finger 25 and a centrally disposed downwardly projecting second finger 26. Both fingers are of rigid construction and are integral with the base portion. The function of the fingers 25 and 26 will be described hereinafter.

Biasing springs, of a type as shown in FIG. 4 and identified as 107 and/or 112 are provided for the pivotal axes 22 and 24 and are adapted to urge the bracket 20 to assume its upright position relative to the housing recess 16, as shown in FIGS. 2 and 3, and to urge the reflector unit to assume the angular position relative to the bracket arms 21 as also seen FIGS. 2 and 3. When the light system is manually moved to its inoperative position, FIG. 1, the bracket 20 will pivot in a clockwise direction, as seen in FIG. 3, about axis 24 overcoming the biasing spring and become accommodated in the housing recess whereby the bracket arms will project rearwardly. Simultaneously with the rearward pivoting of the bracket, unit 18 will pivot in a counterclockwise direction about axis 22 whereby substantially the entire sides 18c of the unit will be disposed between the bracket arms and will be accommodated within the recess 16 and the exposed upper surface 18a of the unit will be in flush relation with the exposed top and rear surfaces of the housing 12.

Positioned within the housing recess 16 and adjacent the bottom thereof is an actuating means such as an elongated follower element 27. Substantially centrally of the element and in alignment with the longitudinal axis of element 27 is a fulcrum pin 28, which interconnects the element to the bottom of the recess. The pin 28 has a ball-shaped upper end 28a which is disposed within a suitable socket 30 formed on the underside of the element. The ball and socket-type connection permits the element to move about at least two axes, as will hereinafter be described. As seen in FIG. 3, element 27 is provided at one end with a rearwardly extending and downwardly offset first tongue 31 and at the opposite end with a forwardly extending second tongue or pintle 32. The pintle 32, tongue 31 and ball-shaped head 28a of pin 28 are preferably in alignment and form a first axis for the element 27. Pintle 32 extends through an elongated slot 33 formed in the front wall 12a of the housing 12. The slot is shown in phantom lines in FIG. 3. The forward end of the pintle 32 is adapted to engage an internal cam surface 34 formed in the focusing ring 14 when the bracket and unit assume their upright operative position as seen in FIG. 3. Thus, as the focusing ring 14 is manually rotated so as to properly focus the subject being photographed, the cam surface 34 will cause the element 27 to pivot relative to the ball-shaped end 28a of pin 28 about a seond axis which is substantially parallel to axes 22 and 24. The offset tongue 31 is in continuous engagement with and subtends bracket finger 25, only when the bracket is in its upright position. Thus, if the pintle 32 of element 27 is depressed by the cam surface 34 of focusing ring 14, the tongue 31 will impart an upward force on finger 25 which in turn will effect a slight clockwise tilt to the bracket and raise the direction of the light beam Y emitted from unit 18. Depression of pintle 32 occurs only when the focusing ring is being manually adjusted to bring a distant subject into focus. The closer the subject is disposed to the camera, the smaller the movement of the element and the smaller amount of tilt imparted to the bracket.

When the bracket 20 is moved to its retracted or inoperative position, FIG. 1, finger 25 will move away from tongue 31 and finger 26 will engage the underside of tongue 31 and raise same, thereby causing pintle 32 to move out of engagement with cam surface 34. Thus, when this condition occurs, the element 27 is not responsive to the movement of the focusing ring 14. A manually adjustable latch 29 is mounted on housing surface 12b for retaining the system 11 in its inoperative position, see FIG. 1.

Beisdes tongue 31 and pintle 32, follower element 27 is provided with a laterally extending first projection 35 protruding from one side thereof and a laterally extending second projection 36 protruding from the opposite side of the element. The function of the projections 35 and 36 will become apparent hereinafter.

As aforenoted, a light control knob 15 is mounted on the front face 12a of the housing 12. The knob is manually rotatable about its central axis and the inner or concealed end of the knob is provided with a cam surface 15a which is engaged by an end 35a of the projection 35. Depending upon the direction of rotation of the control knob 15, the cam surface 15a will cause the end 35a of projection 35 to be raised or lowered. The movement of end 35a is about the first-mentioned axis of the element which is formed by the alignment of the pintle 32, ball-shaped head 28a and tongue 31. Thus, as the projection end 35a is raised, the end 36a of the projection 36 will be lowered, or vice versa, by reason of the latter being disposed on the opposite side of the axis. A suitable biasing spring, not shown, is provided for follower element 27 which will retain projection end 35a in continuous engagement with the cam surface 15a of knob 15.

The movement of projection end 36a is transmitted to an iris member 37 which is adapted to be moved into or out of alignment with the optical axis X of the lens 13. The iris member 37 is of conventional design and is mounted on the interior of the housing for pivotal movement about an axis which is substantially parallel to the aforenoted first axis of the element 27. The iris member is biased by a spring, not shown, so that the projection end 36a of element 27 is in continuous engagement therewith. Thus, even though the light system is disposed in its retracted inoperative position, FIG. 1, whereby the pintle 32 is out of contact with the focusing ring cam surface 34, projection end 35a of element 27 will be biased into contact with the knob cam surface 15a and the iris member 37 will be biased into contact with projection end 36a, thereby permitting movement of the iris member 37 to be responsive to the adjustment of knob 15 notwithstanding whether the light system is in an operative or inoperative position.

A modified form of light system 100 is shown in FIGS. 4 and 5 wherein no light control knob and iris member assembly is combined with the system. In system 100, the reflector unit 101 is connected directly to the camera housing 102 so as to pivot about axle pin 103. Unit 101 includes a casing 104 in which is disposed the electrically energized light source, not shown. The front wall of the casing is provided with an upper transparent or translucent section 104a through which the light beam passes when the light source is energized. The lower section 104b of the casing front wall is substantially planar and, when the system is in its inoperative position, may be substantially flush with the exterior of the housing upper surface. Integral with and extending rearwardly and downwardly from the front wall lower segment 104b is a mounting means such as a curved leg 105, the lower end 105a of which is provided with an opening 105b to accomodate axle pin 103. Adjacent to, but spaced from opening 150b is a lug 106, the function of which will be described more fully hereinafter. Leg 105 and casing 104 are biased as a unit by spring 107 to assume an upright operative position as seen in FIGS. 4 and 5. One end 107a of the spring is anchored to a bearing member 108 forming a part of the camera housing 102. The opposite end 107b of the spring is anchored in an opening 105c formed in leg 105.

Pivotally mounted on axle pin 103 is an actuating means such as an elongated lever 110. One end 110a of lever 110 extends over and is in engagement with lug 106. The opposite end 110b of the lever has the underside thereof engaged by an end 111a of a bell-crank type lever 111, see FIG. 5. A biasing spring 112 is provided so as to maintain lever end 110b in continuous contact with the end 111a of the bell-crank lever. Lever 111 is pivoted at 112' to a second bearing member 113 carried within the housing 102. Lever 111 has a downwardly extending seciton 111b which is in contact with the inner end 114a of an elongated follower element 114. Element 114 is mounted on the front face of housing 102 and is adapted to move in an endwise direction. The outer end 114b of the follower element protrudes from the housing and abuts the rear surface of the focusing ring 115 carried on and movable with an elongated collar 116 threaded into a lens opening formed in the housing. The biasing spring 112 maintains constant contact between levers 110 and 111; lever 111 and follower element 114; and element 114 and the focusing ring 115, thereby preventing any lost motion between the various components or any rattle therebetween which might otherwise occur. Thus, upon the collar 116 being manually threaded into the housing to effect proper focusing of a distant object, a slight counterclockwise tilt is imparted to the reflector unit 101, thereby raising the direction of the light beam emitted from casing 104. A conventional latch similar to latch 29 may be utilized to retain the system 100 in its inoperative position.

The shape, size and location of the light system on the camera housing may be varied from those illustrated and described without departing from the scope of the invention.

Thus, it will be seen that a simple and sturdy self-contained light system has been provided wherein the direction of the light beam emitted therefrom is automatically adjusted relative to the lens optical axis by manual manipulation of the camera focusing means thereby causing the light beam to be properly directed towards the subject being photographed.

I claim:

1. A camera comprising a housing, a lens mounted on one wall of the housing and having a fixed optical axis, focusing means operatively connected to said lens and adjustably mounted on said housing for varying the focal length of said lens, and a self-contained light system mounted on a second wall of said housing for movement between an extended operative position and a retracted inoperative position; said light system including a reflector piece having a light source disposed therein whereby said light source and reflector piece are movable only as a unit between extended and retracted positions; mounting means interconnecting said reflector piece and said housing; and actuating means carried on said housing and being responsive to the adjustment of said focusing means to effect tilting of said reflector piece and light source relative to the lens optical axis, only when said light system is disposed in said extended operative position.

2. The camera of claim 1 including biasing means cooperating with said reflector piece to bias the latter to assume a first predetermined angular position relative to said mounting means when said light system is disposed in said extended operative position.

3. The camera of claim 1 wherein the actuating means comprises an elongated follower element having one end thereof engaging cam means formed on the focusing means, and the opposite end thereof operatively engaging the mounting means.

4. The camera of claim 3 including a manually adjustable light control member mounted on a wall of said camera housing, an iris member adjustably mounted within said housing for movement between an operative position in alignment with the lens optical axis and an inoperative position spaced from said optical axis, said light control member having cam means in engagement with a first laterally projecting portion of said elongated follower element, said element being provided with a second laterally projecting portion in operative engagement with said iris member whereby adjustment of said light control member in one direction effects movement of said iris member to said operative position, and adjustment of said light control member in a second direction effects movement of said iris member to said inoperative position.

5. The camera of claim 1 wherein said light system, when in said retracted inoperative position, having the reflector piece and light source and the mounting means therefor disposed within a recess formed in the second wall of said housing; said light system including means for biasing said reflector piece and light source and said mounting means to assume an extended operative position; said housing being provided with a manually adjustable latch means for retaining said reflector piece and light source and said mounting means in said retracted inoperative position within said housing recess.

6. The camera of claim 5 wherein the mounting means includes means for rendering the actuating means non-responsive to the adjustment of the focusing means when said light system is in the retracted inoperative position.

* * * * *